Figure 1:
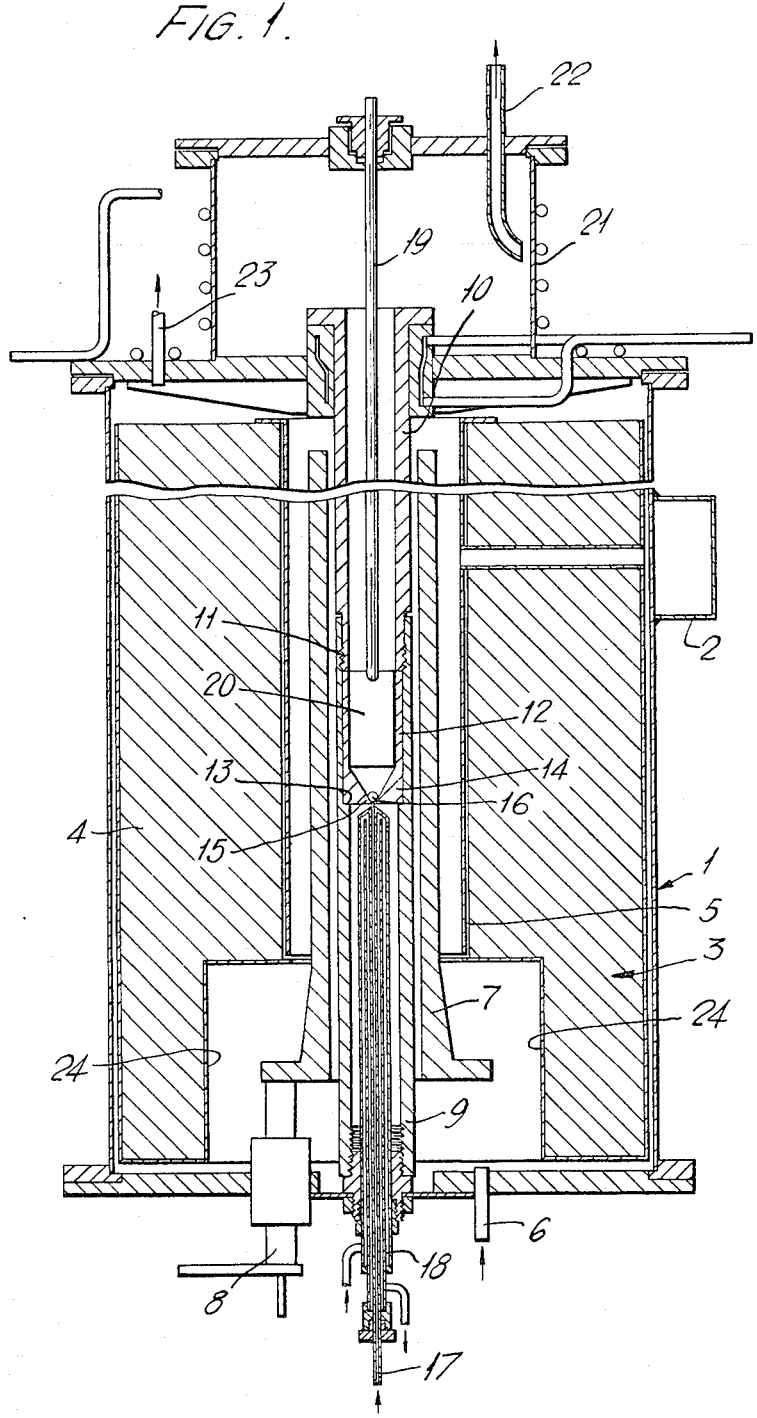

United States Patent Office 3,276,968
Patented Oct. 4, 1966

3,276,968
NUCLEAR FUEL BODY CONTAINING URANIUM CARBIDE SPHEROIDS COATED WITH SILICON CARBIDE
Bryan Edward Ingleby, Salwick, Preston, England, assignor to United Kingdom Atomic Energy Authority, London, England
Filed Mar. 29, 1963, Ser. No. 269,084
Claims priority, application Great Britain, Apr. 13, 1962, 14,475/62
2 Claims. (Cl. 176—69)

This invention relates to that kind of nuclear reactor fuel element which is intended to operate in contact with fluid coolant and to retain fission products which are produced as a result of irradiation of the fuel in a nuclear reactor, whereby contamination of the coolant by the fission products is avoided.

According to the invention, a nuclear reactor fuel element of the hereinbefore specified kind includes a body comprising a plurality of spheroids of sintered uranium carbide, each spheroid having a coating of silicon carbide, and the coated spheroids being dispersed in a matrix of silicon carbide, the thus loaded matrix constituting the fuel body and being formed into a desired shape.

The spheroids may be either of uranium monocarbide or of uranium dicarbide.

It is desirable to control the dispersion of the coated spheroids in the matrix so as to provide that there is an absence of coated spheroids at or near to that or each surface which is in contact with coolant when the fuel body is in operation in a nuclear reactor.

The fuel body may be of solid or hollow cylindrical shape, and may be of elongate form.

A nuclear reactor fuel element according to the invention may comprise a plurality of the said fuel bodies and means for supporting and locating such bodies in a desired relative configuration. For example, the bodies, where cylindrical or hollow cylindrical, may be arranged in clusters or in stacks of clusters.

A related invention also includes a process, which is the subject matter of a divisional application, for producing fuel bodies incorporating sintered uranium carbide spheroids, each spheroid being individually coated with a substantially uniform coating of silicon carbide, and the coated spheroids being dispersed in a matrix of silicon carbide, such process including the steps of granulating mixed uranium dioxide and carbon, spheroidising the granules so formed, effecting reaction-sintering of the spheroids thus formed so as to convert them to spheroids of uranium carbide, coating the uranium carbide spheroids with silicon carbide, mixing the coated spheroids with silicon carbide and carbon, extruding the mixture to form compacts, and effecting self bonding of the compacts by effecting reaction between said last-added carbon and silicon to produce dense fuel bodies.

In order that the invention may be fully understood and more readily carried into practice, a process for producing shaped fuel bodies and a constructional example of a fuel element employing such fuel bodies will now be described.

The process for producing the fuel bodies comprises the following stages, firstly producing spheroids of mixed uranium dioxide and carbon, together with a suitable quantity of a binder, secondly reaction-sintering such spheroids to form dense sintered spheroids of uranium carbide, thirdly coating such sintered spheroids with silicon carbide, fourthly dispersing such coated spheroids in a silicon carbide matrix, and lastly forming the matrix containing the dispersed coated spheroids to a desired shape of high density.

The first stage is performed by milling, with steel balls, a mixture of ceramic grade uranium dioxide (surface area 3 m.$^2$/gram), carbon black (surface was 17 m.$^2$/gram) and aluminium stearate binder in a rubber or rubber-lined pot for 16 hours. The ratio of uranium dioxide to carbon is about 1:3.02, that is slightly in excess of the stoichiometric ratio to produce uranium monocarbide by the formula

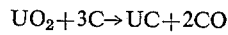

$$UO_2 + 3C \rightarrow UC + 2CO$$

A typical example is 500 grams $UO_2$ and 67 grams carbon black, together with 0.25% by weight aluminium stearate. For the preparation of uranium dicarbide, the following formula applies:

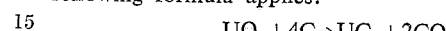

$$UO_2 + 4C \rightarrow UC_2 + 2CO$$

The ratio of $UO_2$ to carbon is now about 1:4.05 and a typical example is 500 grams $UO_2$ and 90 grams carbon black. Although the use of uranium monocarbide appears to have some advantage over the use of uranium dicarbide as nuclear fuel, the latter is by no means inapplicable, and references to uranium monocarbide in the ensuing description should be understood to include uranium dicarbide as an alternative. The milling produces granules of a mixture of the constituents, which granules are then transferred to a polythene bowl in which they are gyrated, the bowl being secured to a conventional sieve shaker which imparts both reciprocatory motion in a vertical direction and oscillatory angular motion in a horizontal plane to the bowl. Spheroids in the size range 200–250 microns are produced by the gyration. Where spheroids of larger diameter are required, the spheroids can be caused to "grow" by addition of more granules of the mixture resulting from ball milling to the spheroids, continuing gyration for periods of about 1 hour and then sieving to remove smaller spheroids formed by independent spheroidisation of those of the granules which have not caused growth of the spheroids already in being when the addition was made. Such smaller spheroids are returned to the ball mill for re-granulation before constituting subsequent additions. The spheroids are grown to a desired size range (for example about 700 microns), removed from the polythene bowl, finally sieved to remove under-sized spheroids, and the retained spheroids are then placed in molybdenum boats in a carbon resistance furnace under about 1 micron of vacuum. The temperature is taken up from ambient at a rate of 100–200° C./hr. until a temperature of about 1360° C. is reached, reaction between the uranium dioxide and the carbon occurring with evolution of carbon monoxide which is removed from the reaction zone by the vacuum pump. When reaction has ceased (indicated by no more carbon monoxide being evolved), the temperature of the furnace is raised at a rate of about 100° C./hr. up to a sintering temperature of 1700° C. at which the furnace temperature is held for about 4 hours. Cooling at a controlled rate follows, and after removal from the furnace, sieving only to break up agglomerates of spheroids is effected. The produced spheroids are found to have retained their spherical form and are of high density.

The uranium monocarbide spheroids are provided with a coating of silicon carbide by employing for coating the vapour resulting from the decomposition of methyl trichlorosilane as suggested by Kendall and by Susman in separate articles contained in the text book "Silicon Carbide," edited by J. R. O'Connor and J. Smiltens and published by Pergammon Press. We have given this suggestion practical form by subjecting the spheroids to the said vapour in a fluidised bed reactor. A suitable fluidised bed reactor is illustrated in FIGURE 1 of the accompanying drawings, FIGURE 1 being a front view in medial section. The fluidised bed reactor comprises a hollow cylindrical casing 1 having a side pocket 2 for a thermocouple (not shown) employed for monitoring heating element temperature, the casing 1 containing an annular thermal insulating structure 3 consisting of alumina bricks 4 contained in a mild steel structure 24 and provided with a molybdenum reflector 5, the structure 3 being in contact with a purge gas, conveniently argon, introduced at inlet 6 and taken off at outlet 23. The structure 3 encompasses a graphite sleeve 7 which provides a resistance heating element fed by a power source 8. The sleeve 7 encompases a bed assembly consisting of a lower hollow cylindrical part 9 of graphite, an upper cylindrical part 10 of graphite which is screwed to the part 9 at 11, and an inner hollow cylindrical part 12 of graphite which is supported at its lower end on an annular shoulder 13 of the part 9. The bore (typically 1½″ diameter) of the part 12 forms the bed chamber 20 and is mainly cylindrical but at its lower end it has a 60° coned portion 14 which forms the base of the fluidised bed chamber 20 and effects outward diffusion of the fluidising gas. An aperture 15 provides inlet for the fluidising and coating gases and is provided with a tungsten carbide ball 16 to act as a valve to prevent loss of bed material when the bed is not fluidised. Fludising and coating gases are supplied to the fluidised bed chamber 20 by a pipe 17 extending from outside the casing to nearly the aperture 15 and provided with a water jacket 18. The temperature of the bed is monitored by a thermocouple 19, and off-gases from the bed pass along the bore of the upper part 10 and into a water-cooled expansion header 21, from whence they are conducted to conventional scrubbing and filtering equipment (not shown) via an outlet pipe 22.

The operation of the bed is as follows: The equipment is first degassed at 1000° C. in a stream of argon, then cooled to 200–300° C. and a charge of uranium carbide spheroids is loaded into the chamber 20. The bed is heated by means of the element 7 to 1200–1850° C., typically 1500° C., with a small flow (about 0.2 litre./min.) of hydrogen passing through the bed. When the desired temperature is reacted, the hydrogen gas flow is increased to fluidise the bed of spheroids (about 20 litres/min.) and at the same time the reactant gas is introduced to the fluidising gas stream. This is accomplished by providing a by-pass (not shown) from the main hydrogen gas flow, the by-pass stream being bubbled through a vessel (not shown) containing methyl trichlorosilane and then being conducted to rejoin the main gas stream. When the desired coating thickness (75–100 microns) has been achieved, the gas stream is stopped, power to the heater element 7 is switched off, and the bed is allowed to cool, whereafter the coated spheroids are elutriated with water, dried, leached for 8 hours in boiling 5 m. nitric acid, again elutriated with water, dried, and then returned to a clean environment (effected by replacement of parts 9, 10 and 12 by new parts) for a further coating of silicon carbide. By means of the second coating, any uranium carbide contamination existing near or on the surface of the initially coated spheres (due for example to fracture of one or more spheroids) is sealed by a coating of uncontaminated silicon carbide.

To allow a thinner silicon carbide coating to be employed without adversely affecting integrity, it has been found that an initial coating of pyrolytic carbon will give the desired result. This can be effected in the same bed, prior to silicon carbide coating, by fluidising on argon at about 5 litres/min. and adding methane or acetylene to the fluidising gas. Such a system of pyrolytic carbon and silicon carbide is known as a duplex coating. It is also possible, if desired, to produce "triplex" coatings of alternate layers of silicon carbide, pyrolytic carbon and silicon carbide.

The coated spheroids so produced are formed into fuel bodies by being dispersed in a silicon carbide matrix as follows: 600 mesh (about 10μ) alpha-silicon carbide powder, ultra-fine colloidal graphite (e.g. DAG 621), and the coated spheroids in the proportion 2 parts by weight of the silicon carbide powder to 1 part by weight of the colloidal graphite and the calculated weight of coated spheroids to give a loading of 40 volume percent, are dry mixed in a Y-cone mixer. This mix is slurried by adding Cranco in methylethylketone, and an epoxy resin solution (e.g. Araldite AY 18 HZ 18). The methylethylketone is allowed to evaporate from the slurry until the mix is of the right plasticity for extrusion. This can be judged by the extrusion pressure required for a sample: 0.5 ton per sq. in. (nominal) is suitable. Typical quantities are 100 grams of the silicon carbide powder, 50 grams of the colloidal graphite, the requisite weight of spheroids (as aforesaid), 75 ml. of the Cranco solution, and 75 ml. of the epoxy resin solution. Extrusion using hardened steel dies and a hydraulic press is then performed to produce "green" compacts, which may, for example, be of solid elongated cylindrical form. The compacts are loaded onto alumina trays to be heated in an air oven, the temperature of which is raised at the rate of 50° C./hr. to 250° C. at which temperature the oven is held for 5 hours. By this means, the epoxy resin is cured and the Cranco lubricant is evaporated off. The compacts are then heated to 750° C. under vacuum at a rate of 50° C./hr., being held at 750° C. for 10 hours to carbonise the epoxy resin. "Siliconising" of the compacts is next performed under vacuum in a high frequency induction heater, the compacts being stood in a graphite crucible containing silicon powder in slight excess of that required to give complete siliconising. Attack of the crucible by molten silicon is prevented by employing a fine grain graphite which is rendered impermeable by impregnation with furfuryl alcohol followed by graphitising. Siliconising takes place when the silicon melts at 1420° C., an exothermic reaction between the silicon and the colloidal graphite in the compacts occurs which produces beta-silicon carbide which bonds the grains of alpha-silicon carbide in the compact together. Fuel bodies of matrix densities 92% of theoretical can be produced, the high densities favouring the exceptional high temperature properties of the bodies.

To equip the fuel bodies for service in a nuclear reactor when assembled with other components into the form of fuel elements, each fuel body formed as aforesaid is provided with a surface layer of "clean" silicon carbide, that is, silicon carbide in which no fuel spheroids are dispersed. This expedient allows a measure of grinding to dimension, should this be necessary, and also provides that no fuel body is at or near the surface of the fuel body which is swept by coolant, thereby ensuring that contamination of the coolant by fission products arising as a result of irradiation does not occur. Where the fuel bodies are of solid elongate cylindrical form, their ends are preferably provided with a relatively thick portion of "clean" silicon carbide, whereby provision, such as a recess, for location and support of each fuel body in a fuel element, can be tolerated. Such surface layers may be provided by ordinary powder metallurgical methods, employing the hereinbefore specified materials, namely alpha silicon carbide, colloidal graphite, lubricant and resin but without spheroids, effecting co-extrusion employing the solid fuel rod as mandrel, and effecting self-bonding of the silicon carbide layer with silicon powder and heating as aforesaid. End portions of silicon carbide may be incorporated by pre-forming them in the green state to a desired shape, for example caps for the ends of each rod, and then bonding such caps to the rods and to the said surface layer by means of the said "siliconising" process.

Figure 2:
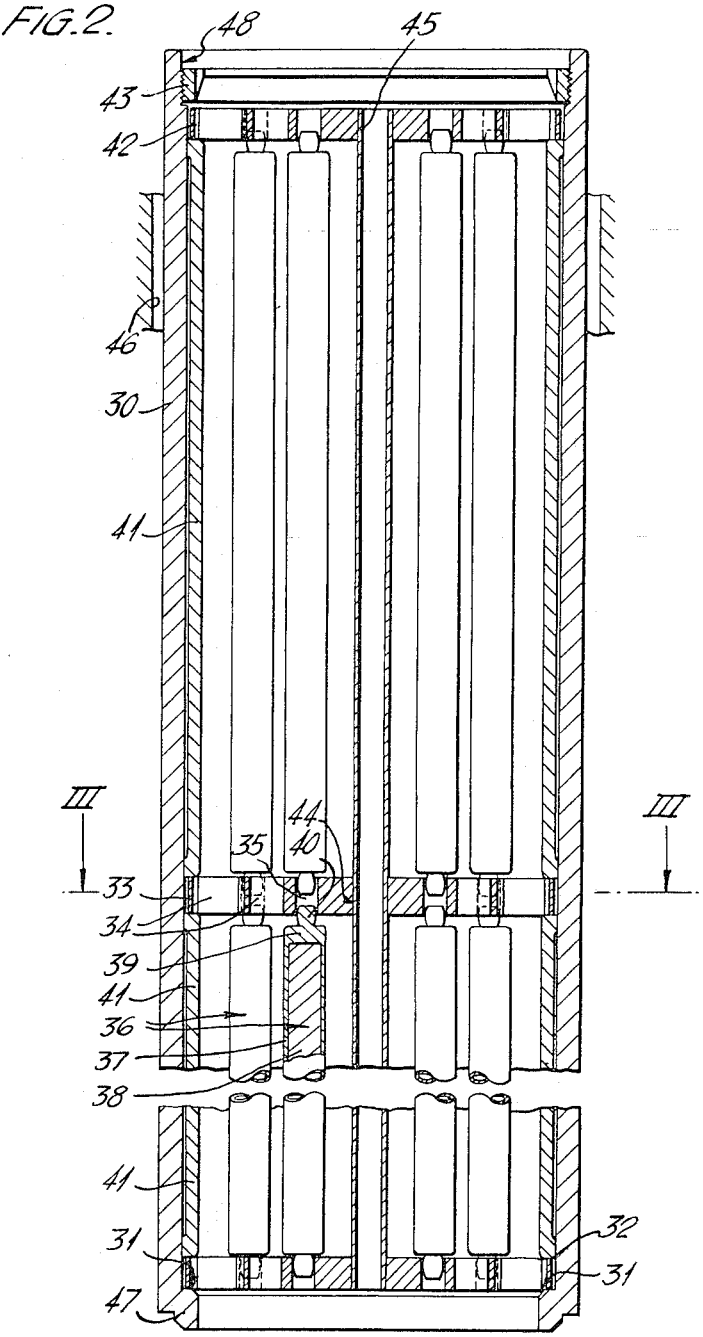
Figure 3:
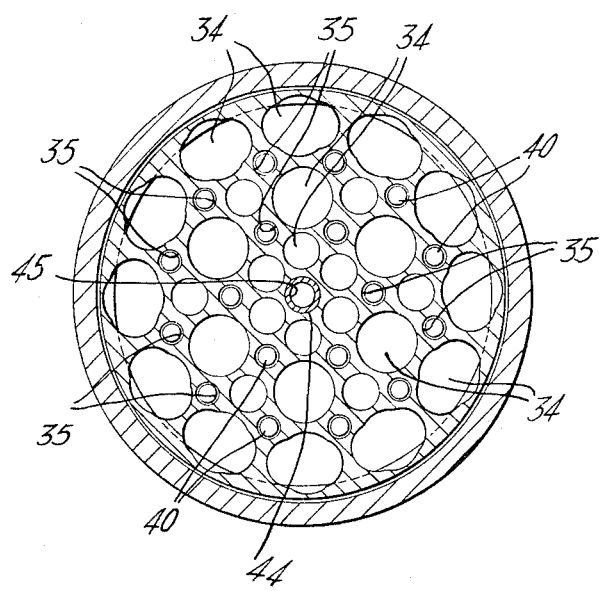

An example of the employment of such surface- and end-protected fuel bodies in a nuclear reactor fuel element will now be described. The fuel element, intended for use in a graphite-moderated, carbon dioxide or helium cooled nuclear reactor with coolant outlet temperatures of the order of 700° C., is illustrated in FIGURES 2 and 3 of the accompanying drawings, FIGURE 2 being a side view in medial section and FIGURE 3 being a plan view in section on line III—III of FIGURE 2.

The fuel element is broadly similar to that shown and described in our British patent specification No. 889,536 and comprises a graphite sleeve 30 having an annular shoulder 31 on which rests a bottom support plate 32 of silicon carbide. The support plate 32 is similar to the or each intermediate support plate 33 which is shown in section in FIGURE 3 and has (referring additionally to FIGURE 3) apertures 34 for coolant flow and apertures 35 for end location of fuel rods 36. Each fuel rod 36 comprises a fuel body of solid elongate cylindrical form the preparation of which has been hereinbefore described. The part of one rod 36 shown sectioned in FIGURE 1 attempts to show, by edge portions 37 sectioned differently from the central portion 38, the surface layer of fuel-free silicon carbide referred to hereinbefore. The sectioned portion also attempts to show caps 39 of fuel-free silicon carbide which are bonded to the portions 37 and 38 in the manner hereinbefore described. Each cap 39 has an end spigot 40 which engages a respective fuel rod hole 35. The fuel rods 36 are supported and located by the bottom support plate 31 and are located by the (or each) intermediate support plate 33 in the manner illustrated so as to allow for upward expansion of the fuel rods 36. The or each intermediate support plate 33 is located by means of inner graphite sleeves 41, the lower of the sleeves 41 being supported by the bottom support plate 31. An upper support plate 42 of silicon carbide rests on the top of the uppermost of the inner graphite sleeves 41 and serves to locate the upper ends of the top cluster of fuel rods 36. A locking ring 43 screwed into the upper end of the outer graphite sleeve 30 serves loosely to retain the upper support plate 42 from becoming disengaged from the fuel element.

Each support plate has a central aperture 44 loosely accommodating a silicon carbide sleeve 45 which forms a passage for accommodating a central tie rod of metal, for example stainless steel (not shown) onto which the fuel element, together with other similar fuel elements, is fitted so that a plurality of fuel elements may be charged and discharged into and out of a fuel element channel (illustrated by the reference numeral 46 in FIGURE 1) as a complete string or unit. The sleeve 45 may in a modification (not shown) be omitted and the central apertures 44 be provided with silicon carbide liners. The outer graphite sleeve 30 is provided with an annular flange 47 at its bottom end for location within an annular portion 48 of reduced diameter at the upper end of the outer graphite sleeve of an adjacent fuel element of the unit. The joint is made so as to minimise leakage between the outer graphite sleeves of adjacent fuel elements.

I claim:
1. For a nuclear reactor fuel element, a fission-product-retaining fuel body comprising a plurality of sintered uranium carbide spheroids each of diameter in the range 200–700 microns, an individual silicon carbide coating on each of said spheroids, a shaped matrix of silicon carbide in which the coated spheroids are dispersed, and a spheroid-free layer of silicon carbide matrix material at any surface of the fuel body for contact with coolant when the fuel body is in operation in a nuclear reactor.

2. For a nuclear reactor fuel element, a fission-product-retaining fuel body comprising a plurality of sintered uranium carbide spheroids each of diameter in the range 200–700 microns, a coating of pyrolytic carbon on each of said uranium carbide spheroids, an individual silicon carbide coating on each of said pyrolytic carbon coated spheroids, a shaped matrix of silicon carbide in which the thus coated spheroids are dispersed, and a spheroid-free layer of silicon carbide matrix material at any surface of the fuel body for contact with coolant when the fuel body is in operation in a nuclear reactor.

References Cited by the Examiner

UNITED STATES PATENTS

| | | | |
|---|---|---|---|
| 2,949,416 | 8/1960 | Wheelock | 204—193.2 |
| 3,009,825 | 11/1961 | O'Brien | 117—100 |
| 3,009,826 | 11/1961 | Straughn | 117—100 |
| 3,014,853 | 12/1961 | Sheehan | 176—78 |
| 3,079,316 | 2/1963 | Johnson | 176—90 |
| 3,089,785 | 5/1963 | Lewis et al. | 176—91 |
| 3,121,047 | 2/1964 | Stoughton et al. | 176—90 |
| 3,122,595 | 2/1964 | Oxley | 176—91 |
| 3,128,235 | 4/1964 | Hackney et al. | 176—78 |
| 3,129,141 | 4/1964 | Burnham et al. | 176—90 |
| 3,151,037 | 9/1964 | Johnson et al. | 176—91 |
| 3,166,614 | 1/1965 | Taylor | 176—91 |

FOREIGN PATENTS 878,927   10/1961   Great Britain.

OTHER REFERENCES

Nuclear Metallurgy, vol. VI, November 1959, pp. 91–93.

Nuclear Fuel Elements by Hausner et al., December 1959, pp. 197–202, 209–212, 265, 271 and 272.

Reactor Core Materials, vol. 4, No. 2, May 1961, pp. 58 and 59.

L. DEWAYNE RUTLEDGE, *Primary Examiner.*

CARL D. QUARFORTH, REUBEN EPSTEIN,
*Examiners.*

R. W. MacDONALD, J. V. MAY,
*Assistant Examiners.*